US012192807B2

(12) United States Patent
Piriou et al.

(10) Patent No.: US 12,192,807 B2
(45) Date of Patent: Jan. 7, 2025

(54) METHOD AND DEVICE FOR PREDICTING A CONNECTION QUALITY TO A CELLULAR NETWORK

(71) Applicant: Continental Automotive GmbH, Hannover (DE)

(72) Inventors: Simon Piriou, Plaisance-du-Touch (FR); Grégory Vial, Auragne (FR)

(73) Assignee: Continental Automotive GmbH, Hannover (DE)

( * ) Notice: Subject to any disclaimer, the term of this patent is extended or adjusted under 35 U.S.C. 154(b) by 424 days.

(21) Appl. No.: 17/603,889

(22) PCT Filed: Apr. 2, 2020

(86) PCT No.: PCT/EP2020/059428
§ 371 (c)(1),
(2) Date: Oct. 14, 2021

(87) PCT Pub. No.: WO2020/212156
PCT Pub. Date: Oct. 22, 2020

(65) Prior Publication Data
US 2022/0217558 A1 Jul. 7, 2022

(30) Foreign Application Priority Data
Apr. 15, 2019 (FR) ...................................... 1903993

(51) Int. Cl.
*H04W 24/08* (2009.01)
*G06N 3/08* (2023.01)
(Continued)

(52) U.S. Cl.
CPC ............. *H04W 24/08* (2013.01); *G06N 3/08* (2013.01); *H04B 17/309* (2015.01); *H04L 43/0811* (2013.01); *H04W 4/23* (2018.02)

(58) Field of Classification Search
CPC ...... G06N 3/08; H04B 17/309; H04L 41/147; H04L 43/0811; H04W 24/08; H04W 4/023; H04W 4/029
See application file for complete search history.

(56) References Cited

U.S. PATENT DOCUMENTS 6,052,602 A * 4/2000 Yamamoto ............ H04W 48/20
455/434
9,998,927 B2 6/2018 Nakata
(Continued)

FOREIGN PATENT DOCUMENTS

CN 101592690 A * 12/2009
JP 2003188786 A * 7/2003

OTHER PUBLICATIONS

Wang et al., "A Novel Inversion Method for Outdoor Coverage Prediction in Wireless Cellular Network", IEEE Trans. Veh. Technol., vol. 59, No. 1, pp. 36-47, Jan. 2010 (Year: 2010).*
(Continued)

*Primary Examiner* — Shah M Rahman

(57) ABSTRACT

A method for predicting a value representative of a quality of connection of a vehicle to a cellular network from a target location on a road network including: training a prediction model on the basis of a determined characteristic of propagation between an access point and the position of a training vehicle and on the basis of a value representative of a quality of the connection of the vehicle to said access point; and predicting a second value representative of a quality of connection to a cellular network at the target location on a road network on the basis of a second characteristic of propagation of a radio signal between the target location and an identified target access point by applying the trained model.

17 Claims, 2 Drawing Sheets

(51) Int. Cl.
   *H04B 17/309* (2015.01)
   *H04L 43/0811* (2022.01)
   *H04W 4/23* (2018.01)

(56) References Cited

U.S. PATENT DOCUMENTS

| | | | |
|---|---|---|---|
| 11,263,549 B2* | 3/2022 | Dronen | G06N 20/00 |
| 2003/0114169 A1* | 6/2003 | Okamura | H04W 64/00 |
| | | | 455/457 |
| 2012/0190380 A1* | 7/2012 | Dupray | G01S 5/0278 |
| | | | 455/456.1 |
| 2012/0303328 A1* | 11/2012 | Maruyama | H04W 16/18 |
| | | | 702/189 |
| 2012/0303556 A1 | 11/2012 | Lin et al. | |
| 2013/0035083 A1* | 2/2013 | Kadel | H04W 84/005 |
| | | | 455/418 |
| 2013/0217418 A1* | 8/2013 | Maurin | H04W 4/02 |
| | | | 455/456.3 |
| 2014/0003404 A1 | 1/2014 | Gillett et al. | |
| 2015/0120087 A1 | 4/2015 | Duan et al. | |
| 2015/0373501 A1 | 12/2015 | Dribinski et al. | |
| 2016/0380820 A1* | 12/2016 | Horvitz | H04W 16/28 |
| | | | 370/254 |
| 2017/0195033 A1* | 7/2017 | Zhang | H04W 72/046 |
| 2017/0201926 A1* | 7/2017 | Krendzel | H04W 4/02 |
| 2018/0167783 A1* | 6/2018 | Khoche | C09J 7/38 |
| 2019/0036630 A1 | 1/2019 | Svennebring et al. | |
| 2019/0215378 A1* | 7/2019 | Munishwar | H04W 4/44 |
| 2019/0320328 A1* | 10/2019 | Magzimof | H04W 28/0231 |
| 2019/0364492 A1* | 11/2019 | Azizi | H04W 76/14 |
| 2020/0225655 A1* | 7/2020 | Cella | G05B 19/41875 |

OTHER PUBLICATIONS

Office Action dated May 27, 2023 from corresponding Chinese patent application No. 202080028871.8.
Search Report dated Jan. 24, 2020 from corresponding French Patent application No. FR 1903993.
International Search Report and Written Opinion dated Jul. 24, 2020 from corresponding International Patent application No. PCT/EP2020/059428.
Office Action dated Sep. 27, 2023 from corresponding Chinese patent application No. 202080028871.8 and DeepL translation of same.

* cited by examiner

[Fig. 1]
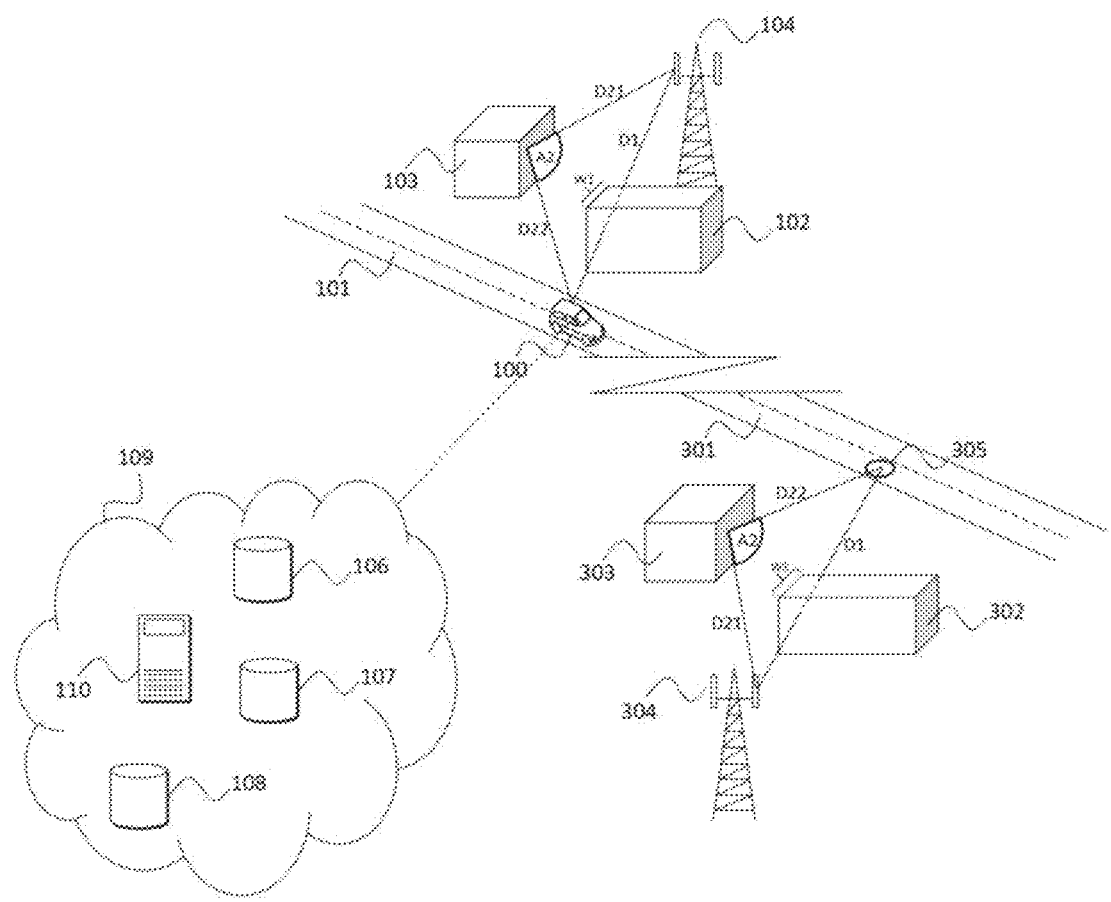

[Fig. 2]
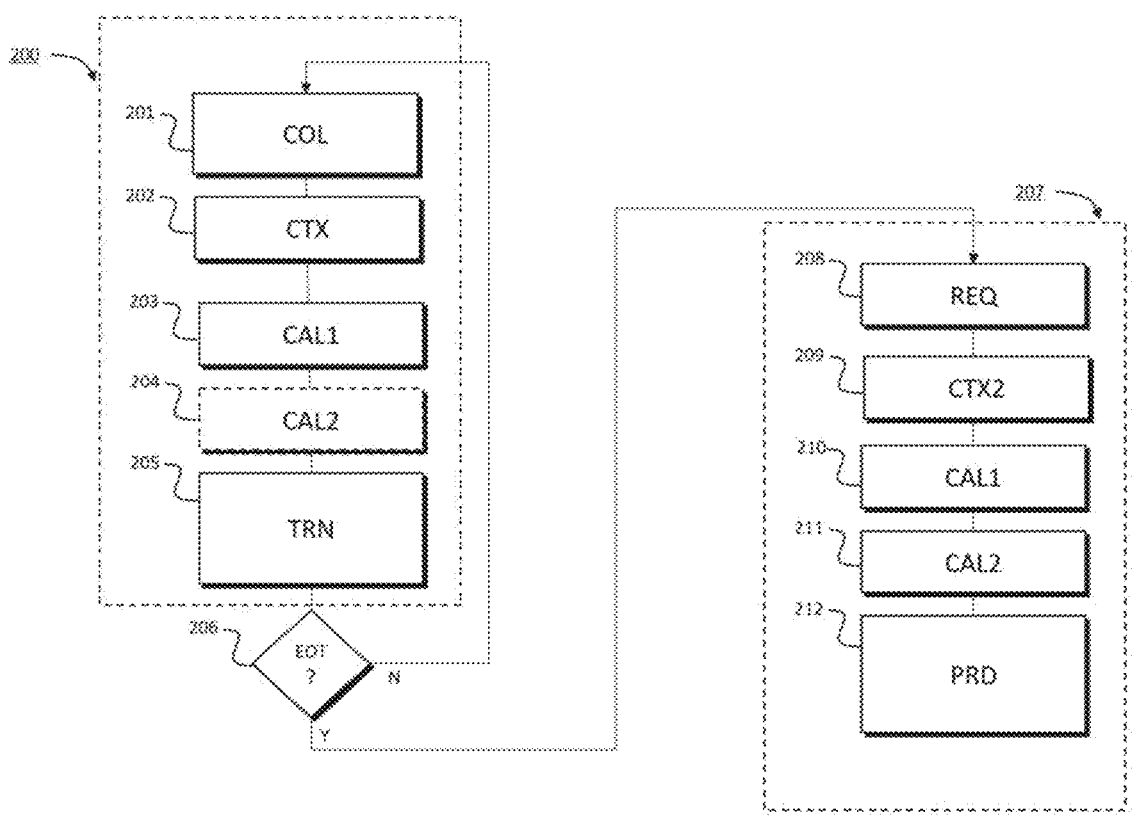
[Fig. 3]
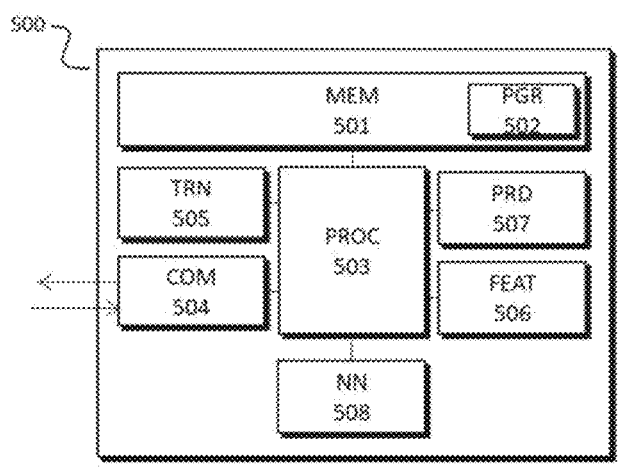

METHOD AND DEVICE FOR PREDICTING A CONNECTION QUALITY TO A CELLULAR NETWORK

BACKGROUND

The invention relates to a device and method for predicting a quality of connection to a cellular network on a road network.

The availability of a connection to a communication network is a growing issue in the field of transportation. In particular, connected vehicles require a connection to be available to transmit or receive data, such as for example road maps, traffic information or even local weather forecasts.

However, despite the efforts of telecommunication operators, certain areas of land are not covered by a wireless telecommunication network, or allow only limited connectivity.

Various technical solutions have been provided to identify areas of limited connectivity.

A first solution consists in producing network coverage maps based on simulations computed on the basis of the geographic location of cell towers and of the relief of the terrain. However such maps, even if they may sometimes highlight certain "unserved areas", remain too imprecise for use in connected vehicles.

Another solution is based on a participative approach. With such an approach, "volunteer" vehicles take measurements of signal strength when using the road network. It is thus possible to complete simulated maps using data that has actually been observed. Unfortunately, "volunteer" vehicles are few and far between and such measurements are unavailable for most of the road network.

There is therefore a need for a method that would allow an index representative of a quality of connection to a mobile network to be obtained for road segments for which no measurements are available, and that does not have the aforementioned drawbacks.

BRIEF SUMMARY

In light of the above, one aim of the invention is to provide an index representative of a quality of connection to a mobile network from a location of a road network for which no quality measurements are available.

Another aim of the invention is to provide a quality-of-connection prediction the accuracy of which is improved compared to the prior art.

Another aim of the invention is to allow a map showing the quality of connection on various portions of a road network to be generated.

To this end, one subject of the invention is a method for predicting a value representative of a quality of connection of a vehicle to a cellular network from a target location on a road network, the method comprising:
- a phase of training a prediction model comprising the following steps:
  receiving, from at least one training vehicle connected to a particular access point, a location datum of the training vehicle, an identifier of the access point to which the training vehicle is connected, and a value representative of a quality of the connection of the training vehicle to said access point,
  determining a characteristic of propagation of a radio signal between the received location and the identified access point,
  training the prediction model on the basis of the determined characteristic of propagation associated with the value representative of a quality of the received connection; and
- a phase of predicting a second value representative of a quality of connection to a cellular network at the target location on a road network, comprising the following steps:
  identifying a target cellular access point accessible from the target location,
  determining a second characteristic of propagation of a radio signal between the target location and the identified target access point,
  predicting a value representative of a quality of connection to the target cellular access point from the target location by applying the model to the second characteristic of propagation.

The invention thus proposes to establish a correlation between, on the one hand, a characteristic of propagation of the signal between a first cellular access point and a first geographic location for which a quality of connection is known, and, on the other hand, a characteristic of propagation of the signal between a second cellular access point and a second geographic location, with a view to predicting a quality of connection from the second location. To do this, the method determines at least one characteristic value of this propagation and associates this value with an observed quality of connection, with a view to training a predictive model. In this way, the trained model may predict a quality of connection to a second access point from a second location.

It is thus possible to provide with precision an index representative of a quality of connection to a mobile network from a location for which no measurements are available. Such a result may for example be used to produce a map of network coverage over a territory even though measurements are not available for the whole territory.

Contrary to the prior-art techniques, which generally provide an index of network coverage for a given location, i.e. a signal power at a given location, the method allows a quality of connection from a given location to be obtained directly, without it being necessary to implement an expensive and imprecise simulation of the coverage of each access point.

It will be noted that the first characteristic of propagation of the signal and the second characteristic of propagation of the signal are of the same nature and are established using an analogous technique. Thus, if the first characteristic used to train the model comprises values [a, b, c], the second characteristic to which the model is applied comprises values [a', b', c'], the values [a, b, c] and [a', b', c'] respectively being of the same nature.

According to one particular embodiment, a characteristic of propagation of a radio signal between a given location and an identified access point is determined depending on a characteristic of at least one topographic element in the environment of the access point.

Thus, the method takes into account the presence and/or nature of a topographic element to characterize the propagation of the radio signal. Topographic elements such as buildings or reliefs influence the propagation of radio waves. By taking such a topographic element into account, the prediction model may establish better correlations between the training data and a location from which a quality of connection is to be predicted. The method thus allows a more reliable prediction to be obtained.

According to one particular embodiment, the method is such that a characteristic of propagation of a radio signal between a given location and an identified access point is a vector of characteristics comprising at least:
- a length of a rectilinear propagation path of a signal from the identified access point to the given location, the signal being transmitted through a first topographic element, and
- at least one characteristic of the first topographic element.

The characteristic of propagation determined to train the model and predict the quality of connection from a second location comprises the straight-line distance between the access point and the location for which the characteristic of propagation is determined, and a characteristic of a building through which the radio signal is transmitted. Specifically, the distance between the access point and the vehicle and the topographic configuration of the environment of the access point are determinants of the propagation of the radio signal. Such a characteristic allows a better correlation between the training data and the environment for which a prediction is desired. The effectiveness of the prediction model is thus increased.

The characteristic of the first topographic element corresponds, according to one particular embodiment, to a propagation distance of the signal through the topographic element. In the case of a building, it is for example a question of a dimension (of the building) traced by the propagating signal. The presence of a building or of a relief on the straight-line path of a radio signal has the known consequence of attenuating the signal. Thus, taking into account a dimension of a topographic element likely to affect the propagation of the signal, such as a building or a relief through which a signal is transmitted, allows the effectiveness of the prediction model to be further improved. Advantageously, in order to further improve the correlations made by the model between the training data and the prediction environment, the vector of characteristics also comprises a value representative of the physical nature (building, relief, material, etc.) of such a topographic element.

A vector of characteristics corresponds to an ordered set of real numbers that is input into the model. According to the invention, such a vector comprises a plurality of values representative of a context of propagation of a radio signal between an access point and a particular location.

According to one particular embodiment, the method is such that the vector of characteristics that is determined for a given location and an identified access point comprises:
- a length of a reflected propagation path of a signal from the access point to the given location, the signal being reflected from a second topographic element, and
- an angle of reflection of the signal from the second topographic element.

The characteristic of propagation comprises additional elements that allow the propagation of the signal between an access point and a geographic location to be further characterized. In particular, the characteristic of propagation comprises a second distance corresponding to the length of a path of the radio signal when it is reflected against a second topographic element in the environment of the access point, and a reflection angle of the signal against this topographic element. The determined vector of characteristics is thus particularly representative of the conditions of propagation of a signal between an access point and a location, thus allowing a prediction that is all the more relevant.

Advantageously, the vector of characteristics determined for training and prediction purposes further comprises a datum representative of the physical nature of the second topographic element. The nature of a topographic element from which a radio signal is reflected affects the quality of reception from a given location, because the power of the signal reflected toward a particular location depends on the nature of the obstacle. By taking into account the nature of the obstacle when training and applying the model, the predictions are improved.

According to one particular embodiment, the method is such that the vector of characteristics that is determined for a given location and an identified access point further comprises a radio configuration of the access point.

As known, the radio configuration of an access point covering a particular location has an influence on the way in which a signal propagates between this access point and the particular location. For example, so-called low frequencies have much better propagation properties in terms of range and of penetration into buildings than high frequencies. Thus, by proposing to include this characteristic in the vector of characteristics that is used to train and apply the model, the method further improves the quality of the predictions by allowing the model to infer, in a particularly relevant manner, connection conditions from a second geographic location on the basis of connection conditions observed from a first geographic location.

According to one particular embodiment, the device is such that the vector of characteristics that is determined for a given location and an identified access point further comprises a value representative of the amount of moisture in the air.

The amount of moisture in the air influences the propagation of radio signals over the air. Thus, by taking into account a value representative of the amount of moisture in the air, the method allows more precise predictions of quality of connection.

According to one particular embodiment, the method is such that the prediction model is a multilayer perceptron neural network.

The problem of determining a quality of connection to a particular access point from a particular location is non-linear, because obstacles generally prevent a direct propagation of the radio signal. A multilayer perceptron (MLP) neural network is particularly suitable for solving non-linear problems and has the advantage of being easy and quick to train.

According to another aspect, the invention relates to a device for predicting a value representative of a quality of connection of a vehicle to a cellular network from a target location, the device comprising a memory in which are stored instructions, a communication module and a computer suitable for implementing, when it is configured by the instructions:
  a phase of training a prediction model comprising the following steps:
  receiving, via the communication module, from at least one training vehicle connected to a particular access point, a location datum of the training vehicle, an identifier of the access point to which the training vehicle is connected, and a value representative of a quality of the connection of the training vehicle to said access point,
  determining, via a characteristic-extracting module, a characteristic of propagation of a radio signal between the received location and the identified access point,
  training the prediction model on the basis of the determined characteristic of propagation associated with the value representative of a quality of the received connection; and a phase of predicting a second value representative of a quality of connection to a cellular network at the target location on a road network, comprising the following steps:

identifying a target cellular access point accessible from the target location, determining, via the characteristic-extracting module, a second characteristic of propagation of a radio signal between the target location and the identified target access point, predicting a value representative of a quality of connection to the target cellular access point from the target location by applying the prediction model to the second characteristic of propagation.

According to one particular embodiment, the device is such that a characteristic of propagation of a radio signal between a given location and an identified access point is determined depending on a characteristic of at least one topographic element in the environment of the access point.

In one particular embodiment, the predicting device is such that the characteristic of propagation of a radio signal between a given location and an identified access point determined by the characteristic-extracting module is a vector of characteristics comprising at least:

a length of a rectilinear propagation path of a signal from the identified access point to the given location, the signal being transmitted through a first topographic element, and at least one characteristic of the first topographic element, a length of a reflected propagation path of a signal from the identified access point to the given location, the signal being reflected from a second topographic element, and an angle of reflection of the signal from the second topographic element.

The invention also relates to a server comprising a device for predicting a quality of connection such as described above.

According to yet another aspect, the invention relates to a data medium containing computer-program instructions configured to implement the steps of a predicting method such as described above, when the instructions are executed by a processor.

The data medium may be a nonvolatile data medium such as a hard disk, a flash memory or an optical disk for example.

The data medium may be any entity or device capable of storing instructions. For example, the medium may comprise a storing means, such as a ROM, RAM, PROM, EPROM, a CD ROM or even a magnetic storing means, a hard disk for example.

Furthermore, the data medium may be a transmissible medium such as an electrical or optical signal, which may be transmitted via an electrical or optical cable, via radio or via other means.

Alternatively, the data medium may be an integrated circuit into which the program is incorporated, the circuit being able to execute or to be used in the execution of the method in question.

Lastly, the invention relates to a road map comprising at least, for a location on the map, a value representative of a quality of connection to a cellular network, said value being obtained using a method such as described above.

The various aforementioned embodiments or features may be added independently of or in combination with one another, to the steps of the predicting method. The servers, devices and data media have at least analogous advantages to those conferred by the method to which they relate.

BRIEF DESCRIPTION OF THE DRAWINGS

Other features, details and advantages of the invention will become apparent on reading the following detailed description and on analyzing the appended drawings, in which:

FIG. 1 shows an example of an environment suitable for implementing the predicting method according to one particular embodiment, FIG. 2 is a flowchart illustrating the main steps of the predicting method according to one particular embodiment, FIG. 3 shows the architecture of a predicting device according to one particular embodiment.

DETAILED DESCRIPTION

FIG. 1 shows a vehicle 100 moving in a traffic lane 101. The vehicle 100 is for example a connected vehicle comprising a wireless communication interface, for example a GPRS, EDGE, UMTS, 3G, 4G, Wi-Fi, WiMAX, etc. interface, allowing it to connect to a communication network 109 via a wireless access network with a view to exchanging messages with at least one device connected to the network 109.

The surroundings of the traffic lane include a cell tower 104 of a cellular communication network and topographic elements 102 and 103, buildings for example. The cell tower 104 comprises a cellular access point conforming to a standard such as GPRS, EDGE, UMTS, 3G, 4G, Wi-Fi, WiMAX and allows the connected vehicle 100 to exchange messages with the telecommunication network 109.

FIG. 1 also shows a second traffic lane 301 the environment of which contains a cell tower 304 and buildings 302 and 303.

FIG. 1 also shows a server 110 connected to the network 109. The server 110 is configured to implement the predicting method according to the invention. To do this, the server 110 comprises at least one computer, for example a processor, a microprocessor, a microcontroller, etc., and a memory storing code instructions that may be executed by the computer to implement the predicting method according to one particular embodiment.

The server 110 further comprises a communication interface allowing it to connect to the telecommunication network 109 and to exchange messages with other devices in accordance with a communication protocol. The network interface is for example an Ethernet interface allowing messages conforming to the TCP/IP protocol to be exchanged with database servers 106, 107 and 108, and with the vehicle 100, via a cellular access network.

The server 110 also includes a multilayer-perceptron (MLP) neural-network prediction model.

The database 106 comprises records relative to the cell towers or wireless access points installed in a territory. For a given access point, a record of the database 106 comprises at least an identifier of an access point and a geographic location. The identifier of the access point allows the access point to be uniquely identified in a territory. It is for example a question of a "Cell ID" when the access point is a GSM cell, an "LCID" in the case of a UMTS cell, or an E-CID in the case of an LTE cell (LTE standing for Long-Term Evolution). The geographic location relates to the site of installation of the access point, which is for example stored in the form of a value of latitude and longitude and possibly of an altitude. According to one particular embodiment, a record of the database 106 further comprises, for a given access point, a radio configuration of the access point. Such a configuration for example corresponds to a transmit power of the radio signal, and/or a frequency band used by the access point. The database 106 in particular comprises records relating to the access points 104 and 304 of FIG. 1.

Thus, the server 110 may interrogate the database 106 to obtain, on the basis of an identifier of the access point 104, the geographic position and optionally the radio configuration of this access point.

The database 107 comprises geolocated topographic information relating to a territory. Such topographic information relates to both reliefs and buildings. For a topographic element, a record of the database 107 comprises at least the geographic position of the element, its footprint, and its height. In one particular embodiment, a record of a topographic element comprises, or allows to be obtained, a three-dimensional model, a geographic position, and a datum representative of the physical nature of this element, such as a Boolean value indicating whether it is a relief or a building.

The database 107 in particular comprises information relating to the buildings 102, 103, 302 and 303 shown in FIG. 1.

Thus, the server 110 is able to interrogate the database 107 with a view to obtaining the description of a set of topographic elements around a given geographic position. For example, the server 110 is able to obtain, on the basis of the geographic coordinates of the access point 104 and/or of the vehicle 100, the geographic location and a three-dimensional representation of the buildings 102 and 103 and, on the basis of the location of the access point 304 or of a target location 305 on the traffic lane 301, the geographic location and a three-dimensional representation of the buildings 302 and 303.

The database 108 is a database of map data on the road network in a territory, in particular comprising the characteristics of the traffic lanes 101 and 301. Conventionally, such a database allows a representation of a road network around a given geographic position to be obtained. However, in one particular embodiment, such a database is not essential to the implementation of the invention.

Of course, the information contained in the databases 106, 107 and 108 may be stored in a single database, for example in the form of an enriched map, or in contrast distributed between a plurality of tables or databases, without however modifying the subject matter of the present invention.

The method for predicting a quality of connection to a cellular network will now be described with reference to FIGS. 1 and 2.

The predicting method according to the invention comprises a first phase 200 consisting in training a prediction model using participative data obtained from a set of training vehicles.

Within the context of the present description, a training vehicle is a vehicle suitable for collecting, for a given location on a road network, an identifier of a point of access to a cellular network to which the vehicle is connected, and a datum representative of a quality of connection to this access point. A training vehicle is further suitable for transmitting these data to a data-processing device such as the server 110. To do this, the training vehicle 100 is equipped with a geolocation system of GNSS type, a GPS for example, allowing it to obtain its geographic location at any time, and a wireless communication interface suitable for setting up a connection to a communication network via a GSM, 2G, 3G or 4G cellular access network or even a Wi-Fi or WiMAX network. The geolocation system may also be a relative positioning system, suitable for providing a position of the vehicle with respect to a reference position, for example with respect to the position of an access point to which the vehicle is connected. The communication interface further allows the vehicle to obtain an identifier of an access point to which it is connected, for example an identifier of a cell of a cellular network, and a datum representative of a quality of the connection to an access point. Such a datum representative of a quality of connection is for example an uplink and/or downlink throughput, a power of the received signal, a packet loss rate during an exchange of data with a server, or a jitter or latency value. According to one particular embodiment, the datum representative of a quality of connection is obtained by analyzing a transmission of data between the vehicle and a server, for example by observing a packet loss rate, a latency or a transmission throughput.

The training vehicle may thus obtain and store a certain number of recordings comprising a geographic location, an access-point identifier and a quality-of-connection value, with a view to transmitting them to the server 110.

The communication interface and the location system of the training vehicle may be an integral part of the vehicle, or else correspond to a mobile terminal, a tablet or smartphone for example, located on board the vehicle. In such a case, the recordings are for example collected and transmitted to a server by an application downloadable onto the terminal.

The vehicle may transmit the stored recordings by means of a connection to a cellular access network or to a Wi-Fi network. As a variant, the recordings may be stored on a removable storage medium, such as a USB flash memory (USB standing for universal serial bus), in order to be subsequently transmitted to the server from a personal computer for example.

Such a training vehicle may be a dedicated vehicle or a personal vehicle of an individual, such as a bicycle, a motorbike, an automobile, etc. It may also be a question of a professional vehicle or of a public-transport vehicle, or even a train traveling over a rail network.

Thus, in a first step 201, the server 110 obtains at least one recording from a training vehicle. It will be noted that the recording may be received directly from a training vehicle, or else be obtained from a database in which are stored data sent beforehand by training vehicles with a view to processing thereof. As explained above, such a recording contains at least a piece of information on geographic location, such as a latitude and a longitude, an identifier of the access point to which the vehicle was connected when it was at said geographic position, and a datum representative of a quality of connection observed at said geographic position.

In a step 202, the server 110 interrogates the database 106 to obtain additional information regarding the access point identified in the recording. The database 106 may be interrogated via an SQL request (SQL standing for structured query language) configured to return at least one geographic location of an access point on the basis of a cellular-access-point identifier. Optionally, the request may also return a height of the access point with respect to ground level and an orientation of the tower. According to one particular embodiment, the request is further configured to return a radio configuration comprising a transmit power of the radio signal and/or a frequency band used by the access point.

The server 110 also interrogates the database 107 in order to obtain topographic information regarding the region of installation of the cellular access point identified in the training data in question. To do this, the server makes an SQL request configured so as to obtain at least one topographic element on the basis of the information on the location of the cellular access point that was obtained from the database 106. As a variant, the request may be configured so as to obtain at least one topographic element on the basis of the information on the geographic location of the training vehicle. According to another variant, the server 110 may determine a region of interest around the identified access point, and interrogate the server 107 using a request configured to ask for the topographic elements located in this region of interest. Such a region of interest is for example a circular region defined by a radius around the location of the access point, the radius for example being determined depending on a radio configuration of the antenna, and/or a distance separating the access point from the training vehicle.

Thus, on the basis of the information obtained from the databases 106 and 107, the server 110 obtains a topographic configuration characteristic of the environment of the access point and of the training vehicle. This particular topographic configuration influences the propagation of the signal between the access point and the vehicle, and therefore the quality of connection of the vehicle to the access point.

In a step 203, the server determines a vector of characteristics on the basis of the data obtained in step 202 from the databases 106 and 107.

According to one particular embodiment, the determination of a vector of characteristics according to the invention comprises computing a length D1 of a rectilinear propagation path of a signal from an identified access point to a given location, the signal being transmitted through a first topographic element. Thus, the vector of characteristics that is determined for a location of the vehicle 100 and an access point 104 to which the vehicle is connected comprises at least the straight-line distance D1 separating the access point 104 from the training vehicle 100 at the time at which the training datum is recorded. The server 110 may compute this distance using a conventional technique for computing distance between two geographic coordinates, the two geographic coordinates being on the one hand the location of the access point, which location was obtained from the database 106, and on the other hand the location of the training vehicle contained in the recording in question.

According to one particular embodiment, a vector of characteristics according to the invention further comprises at least one characteristic of a topographic element forming an obstacle to the direct propagation of the signal from the access point to the training vehicle. For example, the vector comprises the thickness and nature of a topographic element.

Thus the vector of characteristics that is determined for a location of the vehicle 100 and an access point 104 to which the vehicle is connected comprises at least the thickness W1 of the building 102 forming an obstacle to the direct propagation of the signal between the access point 104 and the vehicle 100, and its nature. The nature of the obstacle may be obtained via the database 107 and consist for example of a digital indication as to whether the obstacle is a building, vegetation or even a relief. The nature of the obstacle may also correspond to a building material when the obstacle is a building.

To determine these characteristics, the server 110 may construct a three-dimensional model of a region of interest around the access point. The model comprises the access point, the determined topographic elements and the training vehicle. The server 110 employs a ray-tracing technique to determine the presence of a topographic element forming an obstacle to the direct propagation of a signal between the transmitter of the access point and the training-vehicle position. Such a technique makes it possible not only to identify a topographic element, such as the building 102 of FIG. 1, located on the path of direct propagation of the signal, but also to determine the thickness W1 of the obstacle passed through by the signal. Furthermore, modern graphics processors comprise dedicated circuits for performing such ray tracing. Such a technique may thus be easily implemented by the server 110.

According to one particular embodiment, a vector of characteristics according to the invention further comprises, for a given location and an identified access point, a length D2 of a reflected propagation path of a signal from the identified access point to the given location, the signal being reflected from a second topographic element 103, and an angle A2 of reflection of the signal from the second topographic element 103.

Thus, in a step 204, the server 110 determines a distance D2 composed of a first distance D21 between the tower of the access point 104 and a topographic element 103 causing a reflection of a radio signal transmitted by the access point at an angle A2, and of a second distance D22 between the topographic element 103 and the location of the training vehicle 100. The values D2 and A2 are determined by the server using a ray-tracing technique in the modeled three-dimensional environment described above. The characteristics D2 and A2 thus determined are added to the vector of characteristics.

According to one particular embodiment, a vector of characteristics according to the invention further comprises a value representative of an amount of moisture in the air. This value may correspond to an average value observed in a region and be obtained via the communication network 109 from a weather-data server, or from a measurement taken by a sensor of the training vehicle and transmitted to the server in the step 201 of collecting participative data.

According to one particular embodiment, a vector of characteristics according to the invention further comprises at least one datum regarding the radio configuration of the access point. Thus, the vector of characteristics that is determined by the server 110 may comprise a value representative of the radio transmit power of the access point and/or of a frequency band used by the access point, this value being obtained from the database 106.

At this stage, the determined vector of characteristics comprises an ordered set of real numerical values, which will possibly have been scaled using conventional statistical processing techniques.

The method comprises a step 205 in which the prediction model is trained on the basis on the one hand of the vector of characteristics that was determined in steps 203 and 204 and on the other hand of the datum representative of the quality of connection that was obtained in step 201. To do this, step 205 consists in inputting into the prediction model the vector of characteristics that was determined in steps 203 and 204, to which is added the datum representative of the quality of connection that was obtained in step 201. It is a question of supervised learning, the example of which is the datum representative of the obtained quality of connection.

A high number of recordings may be required to correctly train the model. Thus, the training phase is repeated for a plurality of locations and a plurality of training vehicles, in order to determine a plurality of vectors of characteristics on the basis of which the training step is repeated until the model is sufficiently trained.

The training phase may lastly comprise a step 206 for determining the end of training. According to one particular embodiment, the model is considered trained when a predetermined number of recordings and/or locations has been processed.

Preferably, the training is carried out on the basis of participative data collected for a set of access points that are representative of the access points of a territory. For example, the training is carried out on the basis of data relating to access points located in an urban environment and access points located in a rural environment, and for access points configured to use various frequency bands. In this way, the trained model is adapted to deliver more reliable predictions when it is applied to data from access points of similar geographic and/or radio configuration. Thus, according to one particular embodiment, the training is considered to have finished when the training data input into the model are sufficiently representative of the possible configurations in a territory, in terms of topology, access-point radio configuration, distances, etc.

According to one particular embodiment, the training phase starts at a time T and has a certain duration, one week for example. During this period, data from a plurality of training vehicles for a plurality of locations are collected and used to train the prediction model. The training phase then ends when the training period ends. As a variant, the training phase 200 is reiterated periodically, for example every evening, after new data has been collected, in order to update the model.

When the server 110 determines, in step 206, that the prediction model has been trained, it implements a predicting phase 207.

To do this, the server obtains, in step 208, a target geographic location and a particular access-point identifier, for which location and identifier a prediction of quality of connection is requested. The server 110 may obtain a target geographic location on the basis of a map of the road network, which map is obtained from the database 108, or of a request transmitted by a device.

With reference to FIG. 1, the target location for example corresponds to a geographic location 305 on a main road 301, for which location it is desired to obtain a forecast of quality of connection to a cellular network. On the basis of the target geographic location 305, the server 110 determines an access point 304 to which a vehicle will be connected when located at position 305. To do this, the server 110 may for example use the database 106 to identify the access point closest to the location 305. Of course, any other means for determining a cellular access point for the connection of a terminal from a given location may be implemented.

In steps 209, 210 and 211, the server 110 implements mechanisms similar to those implemented in steps 202, 203 and 204 described above, respectively, to determine a vector of characteristics on the basis of a location and of an access-point identifier. In other words, the server obtains information from the databases 106 and 107 in order to construct a three-dimensional model of a region of interest around the access point 304 and the target location 305 and uses a ray-tracing technique to determine a vector of characteristics. The type, the order and the number of values of the vector of characteristics that is determined in the predicting phase are identical to the type, the order and the number of values of the vector of characteristics that is determined in the phase of training the prediction model.

In a step 212, the server 110 applies the vector of characteristics that is determined for the target location 305 and the access point 304 to the trained prediction model to obtain a value representative of the quality of connection from the target location.

According to one particular embodiment, target locations are determined from a road map. For example, the server may obtain a map of a road network from the database 108 and implement the predicting method to determine a quality of connection at different locations on the various sections of the road network. In this way, it is possible to obtain an enriched map of a road network associating predicted qualities of connection with locations on sections of road. Such a map for example allows a connected vehicle to download large amounts of data in advance when a bad connection is predicted on a future part of a route.

According to one particular embodiment, the predicting method is implemented by a predicting device. The architecture of such a device is schematically shown in FIG. 3.

FIG. 3 shows a device 500 suitable for implementing the predicting method according to one particular embodiment.

The device comprises a storage space 501, for example a memory MEM, and a processing unit 503 that is for example equipped with a processor PROC. The processing unit may be driven by a program 502, for example a computer program PGR, implementing the predicting method described with reference to FIGS. 1 and 2, and in particular the steps of receiving, from at least one training vehicle connected to a particular access point, a location datum of the training vehicle, an identifier of the access point to which the training vehicle is connected, and a value representative of a quality of the connection of the training vehicle to said access point, of determining a characteristic of propagation of a radio signal between the received location and the identified access point, of training the prediction model on the basis of the determined characteristic of propagation associated with the received value representative of a quality of the connection, and the steps of identifying a target cellular access point accessible from the target location and a second characteristic of propagation of a radio signal between the target location and the identified target access point, and of predicting a value representative of a quality of connection to the target cellular access point from the target location by applying the model to the second characteristic of propagation.

On initialization, the instructions of the computer program 502 are for example loaded into a RAM (random-access memory) before being executed by the processor of the processing unit 503. The processor of the processing unit 503 implements the steps of the predicting method according to the instructions of the computer program 502.

To do this, the device 500 comprises, in addition to the memory 501, communication means 504 (COM) allowing the device to connect to a communication network and to exchange data with other devices via the telecommunication network, and in particular to receive, from at least one training vehicle connected to a particular access point, a location datum of the training vehicle, an identifier of the access point to which the training vehicle is connected, and a value representative of a quality of the connection of the training vehicle to said access point. The communication means are for example a wireless network interface, of one of the following types: GSM, EDGE, 2G, 3G, 4G, Wi-Fi, WiMAX, etc., and allow messages to be exchanged in accordance with the TCP/IP communication protocol.

The device also comprises a prediction model 508 suitable for being trained on the basis of a first set of characteristics, in order to predict a value on the basis of a second set of characteristics. Such a prediction model is for example a multilayer-perceptron neural network NN. The prediction model 508 is for example implemented via computer-program instructions loaded into the memory 501 of the device and executed by the processing unit 503.

The device also comprises a characteristic-extracting module 506 suitable for determining at least one characteristic of propagation of a radio signal between a geographic location and an identified access point. In particular, the extracting module 506 is suitable for determining at least one characteristic of propagation of a radio signal between a geographic location and an identified access point, which location and access point are received via the communication module 504 from a training vehicle, and at least one characteristic of propagation of a radio signal between a target geographic location and an identified target access point. The module 506 may be implemented via computer-program instructions configured to, when they are executed by the processor 503, obtain, from a database, the position of an access point on the basis of an identifier of said access point, and to implement a ray-tracing technique in a three-dimensional model of the environment of the access point with a view to determining:
- a length of a rectilinear propagation path of a signal from an identified access point to a location, the signal being transmitted through a first topographic element, and
- at least one characteristic of the first topographic element;

and, according to one particular embodiment, to determining:
- a length of a reflected propagation path of a signal from an identified access point to a given location, the signal being reflected from a second topographic element, and
- an angle of reflection of the signal from the second topographic element.

The device 500 also comprises a module 505 for training the prediction model 507. The training module 505 is for example implemented by a processor driven by instructions, the instructions being configured to obtain, from the extracting module 506, at least one characteristic of propagation of a radio signal between a geographic location and an identified access point, which location and access point are received via the communication module 504, to obtain a value representative of a quality of connection from the geographic location, and to input into the predictive model 508 the obtained characteristic of propagation of a radio signal in association with said value representative of a quality of connection.

The device 500 lastly comprises a prediction module 507 implemented by a processor driven by instructions. These instructions are configured to obtain, from the extracting module 506, at least one characteristic of propagation of a radio signal between a target geographic location and an identified target access point, with a view to inputting the obtained characteristic of propagation into the prediction model 508 in order to obtain, by applying the trained model to the determined characteristic of propagation, a prediction of quality of connection for the target location.

According to one particular embodiment, the device updates, via a suitable SQL request transmitted via the communication module 504, a database of map data by associating the predicted quality with a geographic location on the map.

According to one particular embodiment, the device is integrated into a server.

The invention claimed is:

1. A method for predicting a value representative of a quality of connection of a vehicle to a cellular network from a target location on a road network, the method comprising:
- a phase of training a prediction model comprising the following steps:
  - receiving, from at least one training vehicle connected to a particular access point, a location datum of the training vehicle, an identifier of the access point to which the training vehicle is connected, and a value representative of a quality of the connection of the training vehicle to said access point,
  - determining a characteristic of propagation of a radio signal between the received location and the identified access point, comprising at least one length of a rectilinear propagation path of the signal from the identified access point to the received location, the signal being transmitted through a first topographic element, and at least one characteristic of the first topographic element,
  - training the prediction model on the basis of the determined characteristic of propagation associated with the value representative of a quality of the received connection; and
- a phase of predicting a second value representative of a quality of connection to a cellular network at the target location on a road network, comprising the following steps:
  - identifying a target cellular access point accessible from the target location,
  - determining a second characteristic of propagation of a radio signal between the target location and the identified target access point, comprising at least one length of a rectilinear propagation path of the signal from the identified access point to the target location, the signal being transmitted through a first topographic element, and at least one characteristic of the first topographic element,
  - predicting a value representative of a quality of connection to the target cellular access point from the target location by applying the model to the second characteristic of propagation; and
- wherein a vector of characteristics that is determined for a given location and an identified access point comprises:
  - a length of a reflected propagation path of a signal from the access point to the given location, the signal being reflected from a second topographic element, the length of the reflected propagation path being a sum of a distance from the access point to the second topographic element and a distance from the second topographic element to the given location, and
  - an angle of reflection of the signal from the second topographic element.

2. The method as claimed in claim 1, wherein the vector of characteristics that is determined for a given location and an identified access point further comprises a datum representative of the physical nature of the second topographic element.

3. The method as claimed in claim 1, wherein a vector of characteristics that is determined for a given location and an identified access point further comprises a radio configuration of the identified access point.

4. The method as claimed in claim 1, wherein a vector of characteristics that is determined for a given location and an identified access point further comprises a value representative of the amount of moisture in the air.

5. A device for predicting a value representative of a quality of connection of a vehicle to a cellular network from a target location, the device comprising a memory in which are stored instructions, a communication module and a computer suitable for implementing, when it is configured by the instructions:

a phase of training a prediction model comprising the following steps:

receiving, via the communication module, from at least one training vehicle connected to a particular access point, a location datum of the training vehicle, an identifier of the access point to which the training vehicle is connected, and a value representative of a quality of the connection of the training vehicle to said access point, determining, via a characteristic-extracting module, a characteristic of propagation of a radio signal between the received location and the identified access point, comprising at least one length of a rectilinear propagation path of the signal from the identified access point to the received location, the signal being transmitted through a first topographic element, and at least one characteristic of the first topographic element, training the prediction model on the basis of the determined characteristic of propagation associated with the value representative of a quality of the received connection; and a phase of predicting a second value representative of a quality of connection to a cellular network at the target location on a road network, comprising the following steps:

identifying a target cellular access point accessible from the target location, determining, via the characteristic-extracting module, a second characteristic of propagation of a radio signal between the target location and the identified target access point, comprising at least one length of a rectilinear propagation path of the signal from the identified access point to the target location, the signal being transmitted through a first topographic element, and at least one characteristic of the first topographic element, predicting a value representative of a quality of connection to the target cellular access point from the target location by applying the prediction model to the second characteristic of propagation; and wherein a vector of characteristics that is determined for a given location and an identified access point comprises:

a length of a reflected propagation path of a signal from the access point to the given location, the signal being reflected from a second topographic element, the length of the reflected propagation path being a sum of a distance from the access point to the second topographic element and a distance from the second topographic element to the given location, and an angle of reflection of the signal from the second topographic element.

6. The device for predicting a quality of connection as claimed in claim 5, wherein the device is a server.

7. A non-transitory data medium containing computer-program instructions that, when executed by a processor, are configured to implement operations for predicting a value representative of a quality of connection of a vehicle to a cellular network from a target location on a road network, the operations comprising:

a phase of training a prediction model comprising the following steps:

receiving, from at least one training vehicle connected to a particular access point, a location datum of the training vehicle, an identifier of the access point to which the training vehicle is connected, and a value representative of a quality of the connection of the training vehicle to said access point, determining a characteristic of propagation of a radio signal between the received location and the identified access point, comprising at least one length of a rectilinear propagation path of the signal from the identified access point to the received location, the signal being transmitted through a first topographic element, and at least one characteristic of the first topographic element, training the prediction model on the basis of the determined characteristic of propagation associated with the value representative of a quality of the received connection; and a phase of predicting a second value representative of a quality of connection to a cellular network at the target location on a road network, comprising the following steps:

identifying a target cellular access point accessible from the target location, determining a second characteristic of propagation of a radio signal between the target location and the identified target access point, comprising at least one length of a rectilinear propagation path of the signal from the identified access point to the target location, the signal being transmitted through a first topographic element, and at least one characteristic of the first topographic element, predicting a value representative of a quality of connection to the target cellular access point from the target location by applying the model to the second characteristic of propagation; and wherein a vector of characteristics that is determined for a given location and an identified access point comprises:

a length of a reflected propagation path of a signal from the access point to the given location, the signal being reflected from a second topographic element, the length of the reflected propagation path being a sum of a distance from the access point to the second topographic element and a distance from the second topographic element to the given location, and an angle of reflection of the signal from the second topographic element.

8. A road map comprising at least, for a location on the map, a value representative of a quality of connection to a cellular network, said value being obtained using a method comprising:

a phase of training a prediction model comprising the following steps:

receiving, from at least one training vehicle connected to a particular access point, a location datum of the training vehicle, an identifier of the access point to which the training vehicle is connected, and a value representative of a quality of the connection of the training vehicle to said access point, determining a characteristic of propagation of a radio signal between the received location and the identified access point, comprising at least one length of a rectilinear propagation path of the signal from the identified access point to the received location, the signal being transmitted through a first topographic element, and at least one characteristic of the first topographic element, training the prediction model on the basis of the determined characteristic of propagation associated with the value representative of a quality of the received connection; and a phase of predicting a second value representative of a quality of connection to a cellular network at the target location on a road network, comprising the following steps:

identifying a target cellular access point accessible from the target location, determining a second characteristic of propagation of a radio signal between the target location and the identified target access point, comprising at least one length of a rectilinear propagation path of the signal from the identified access point to the target location, the signal being transmitted through a first topographic element, and at least one characteristic of the first topographic element, predicting a value representative of a quality of connection to the target cellular access point from the target location by applying the model to the second characteristic of propagation; and wherein a vector of characteristics that is determined for a given location and an identified access point comprises:

a length of a reflected propagation path of a signal from the access point to the given location, the signal being reflected from a second topographic element, the length of the reflected propagation path being a sum of a distance from the access point to the second topographic element and a distance from the second topographic element to the given location, and an angle of reflection of the signal from the second topographic element.

9. The device as claimed in claim 5, wherein the vector of characteristics that is determined for a given location and an identified access point further comprises a datum representative of the physical nature of the second topographic element.

10. The device as claimed in claim 5, wherein a vector of characteristics that is determined for a given location and an identified access point further comprises a radio configuration of the identified access point.

11. The device as claimed in claim 5, wherein a vector of characteristics that is determined for a given location and an identified access point further comprises a value representative of the amount of moisture in the air.

12. The non-transitory data medium as claimed in claim 7, wherein the vector of characteristics that is determined for a given location and an identified access point further comprises a datum representative of the physical nature of the second topographic element.

13. The non-transitory data medium as claimed in claim 7, wherein a vector of characteristics that is determined for a given location and an identified access point further comprises a radio configuration of the identified access point.

14. The non-transitory data medium as claimed in claim 7, wherein a vector of characteristics that is determined for a given location and an identified access point further comprises a value representative of the amount of moisture in the air.

15. The road map as claimed in claim 8, wherein the vector of characteristics that is determined for a given location and an identified access point further comprises a datum representative of the physical nature of the second topographic element.

16. The road map as claimed in claim 8, wherein a vector of characteristics that is determined for a given location and an identified access point further comprises a radio configuration of the identified access point.

17. The road map as claimed in claim 8, wherein a vector of characteristics that is determined for a given location and an identified access point further comprises a value representative of the amount of moisture in the air.

* * * * *